(12) United States Patent
Kim et al.

(10) Patent No.: US 11,424,474 B2
(45) Date of Patent: Aug. 23, 2022

(54) SECONDARY BATTERY, AND APPARATUS AND METHOD FOR MANUFACTURING THE SAME

(71) Applicant: LG Chem, Ltd., Seoul (KR)

(72) Inventors: In Chul Kim, Daejeon (KR); Seok Koo Kim, Daejeon (KR); Ju Ri Kim, Daejeon (KR); Jooyong Song, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 607 days.

(21) Appl. No.: 16/349,877

(22) PCT Filed: Feb. 28, 2018

(86) PCT No.: PCT/KR2018/002506
§ 371 (c)(1),
(2) Date: May 14, 2019

(87) PCT Pub. No.: WO2018/207999
PCT Pub. Date: Nov. 15, 2018

(65) Prior Publication Data
US 2020/0083555 A1    Mar. 12, 2020

(30) Foreign Application Priority Data
May 8, 2017   (KR) .................. 10-2017-0057392

(51) Int. Cl.
*H01M 10/04*  (2006.01)
*H01M 4/38*   (2006.01)
*H01M 4/02*   (2006.01)

(52) U.S. Cl.
CPC ....... *H01M 10/0404* (2013.01); *H01M 4/382* (2013.01); *H01M 2004/027* (2013.01); *H01M 2004/028* (2013.01)

(58) Field of Classification Search
CPC .......... H01M 10/0404; H01M 10/058; H01M 10/12; H01M 10/28; H01M 10/38
See application file for complete search history.

(56) References Cited

U.S. PATENT DOCUMENTS 9,166,222 B2   10/2015  Amiruddin et al.
9,899,698 B2   2/2018   Ku et al.
(Continued)

FOREIGN PATENT DOCUMENTS

CN   102668182 A   9/2012
CN   103190026 A   7/2013
(Continued)

*Primary Examiner* — Nathanael T Zemui
(74) *Attorney, Agent, or Firm* — Birch, Stewart, Kolasch & Birch, LLP

(57) ABSTRACT

The present invention relates to an apparatus for manufacturing a secondary battery, the apparatus comprising a radical unit sheet supply part that supplies a semi-finished radical unit sheet on which a first electrode sheet is laminated on an outermost portion thereof, a film sheet supply part that supplies a film sheet coated with a stabilized lithium metal power (SLMP) layer to attach the film sheet to each of top and bottom surfaces of the semi-finished radical unit sheet, a film sheet pressing part that allows the SLMP layer applied to the film sheet to be bonded to each of the top and bottom surfaces of the semi-finished radical unit sheet, and a film sheet removing part that removes the film sheet from the SLMP layer bonded to the semi-finished radical unit sheet to manufacture a finished radical unit sheet.

15 Claims, 4 Drawing Sheets

(56) References Cited

U.S. PATENT DOCUMENTS

| | | | |
|---|---|---|---|
| 9,923,195 B2 | 3/2018 | Amiruddin et al. | |
| 2011/0135810 A1* | 6/2011 | Yakovleva | C23C 10/30 |
| | | | 427/77 |
| 2012/0105007 A1 | 5/2012 | Amiruddin et al. | |
| 2012/0107680 A1 | 5/2012 | Amiruddin et al. | |
| 2014/0272507 A1 | 9/2014 | Ku et al. | |
| 2014/0306664 A1 | 10/2014 | Kim et al. | |
| 2015/0010696 A1 | 1/2015 | Yakovleva et al. | |
| 2015/0144013 A1* | 5/2015 | Liu | B30B 3/04 |
| | | | 100/102 |
| 2015/0325855 A1* | 11/2015 | Kawakami | G04G 21/00 |
| | | | 361/679.55 |
| 2015/0357679 A1* | 12/2015 | Sano | H01M 50/152 |
| | | | 429/94 |
| 2018/0131031 A1 | 5/2018 | Ku et al. | |
| 2018/0198118 A1 | 7/2018 | Amiruddin et al. | |
| 2019/0013513 A1* | 1/2019 | Liu | H01M 4/1395 |
| 2019/0020034 A1* | 1/2019 | Umetsu | H01M 4/5825 |
| 2019/0214631 A1* | 7/2019 | Fitch | H01M 4/134 |

FOREIGN PATENT DOCUMENTS

| | | |
|---|---|---|
| CN | 104054205 A | 9/2014 |
| JP | H11135153 A | 5/1999 |
| JP | 2008-084842 A | 4/2008 |
| JP | 2016-191102 A | 11/2016 |
| KR | 10-2001-0037099 A | 5/2001 |
| KR | 10-2001-0037101 A | 5/2001 |
| KR | 10-0359605 B1 | 11/2002 |
| KR | 10-2003-0039702 A | 5/2003 |
| KR | 10-2012-0091236 A | 8/2012 |
| KR | 10-2013-0097959 A | 9/2013 |
| KR | 10-2013-0108620 A | 10/2013 |
| KR | 10-2015-0037363 A | 4/2015 |
| KR | 10-2015-0068941 A | 6/2015 |
| KR | 10-2016-0023072 A | 3/2016 |
| KR | 10-2016-0047690 A | 5/2016 |

* cited by examiner ated Feb. 28, 2018, designating the United States, which claims priority to Korean Application No. 10-2017-0057392, filed May 8, 2017. The entire contents of the aforementioned patent applications are incorporated herein by this reference.

SECONDARY BATTERY, AND APPARATUS AND METHOD FOR MANUFACTURING THE SAME

CROSS-REFERENCES TO RELATED APPLICATIONS

This application is a U.S. national phase application, pursuant to 35 U.S.C. § 371, of PCT/KR2018/002506, filed Feb. 28, 2018, designating the United States, which claims priority to Korean Application No. 10-2017-0057392, filed May 8, 2017. The entire contents of the aforementioned patent applications are incorporated herein by this reference.

TECHNICAL FIELD

The present invention relates to a secondary battery, and an apparatus and method for manufacturing the same, and more particularly, to a secondary battery that is capable of improving charging/discharging efficiency through stabilized lithium metal powder (SLMP) to increase energy density, and an apparatus and method for manufacturing the same.

BACKGROUND ART

In general, secondary batteries are chargeable and dischargeable unlike primary batteries that are not chargeable and are widely used in electronic devices such as mobile phones, notebook computers, camcorders, and the like, or electric vehicles and the like.

Such a secondary battery comprises an electrode assembly and a case that accommodates the electrode assembly, and the electrode assembly has a structure in which a separator and electrodes are vertically laminated.

In order to improve energy density, the secondary battery uses materials having a capacity per weight that is higher than graphite, such as Si, Sn, and SiO, for a negative electrode.

Although the above-described secondary battery has a higher capacity than graphite, the charging/discharging efficiency is low. Thus, the secondary battery has a limitation in increasing the energy density. Here, when the charging/discharging efficiency is improved, the energy density may also increase.

DISCLOSURE OF THE INVENTION

Technical Problem

The present invention has been made to solve the above problems, an object of the present invention is to provide a secondary battery in which a stabilized lithium metal powder layer is bonded to a surface of a negative electrode plate laminated on the outermost portion of an electrode assembly to significantly improve the charging/discharging efficiency of the negative electrode plate and thereby to increase the energy density, and an apparatus and method for manufacturing the same.

Technical Solution

To achieve the above-described object, an apparatus for manufacturing a secondary battery according to an embodiment of the present invention comprises a radical unit sheet supply part that supplies a semi-finished radical unit sheet on which a first electrode sheet is laminated on an outermost portion thereof, a film sheet supply part that supplies a film sheet coated with a stabilized lithium metal power (SLMP) layer to attach the film sheet to each of top and bottom surfaces of the semi-finished radical unit sheet, a film sheet pressing part that presses the film sheet to be closely attached to each of the top and bottom surfaces of the semi-finished radical unit sheet to be bonded to the semi-finished radical unit sheet, the film sheet pressing part allowing the SLMP layer applied to the film sheet to be bonded to each of the top and bottom surfaces of the semi-finished radical unit sheet, and a film sheet removing part that removes the film sheet from the SLMP layer bonded to the semi-finished radical unit sheet to manufacture a finished radical unit sheet.

The finished radical unit sheet may have a structure in which the SLMP layer, the first electrode sheet, a first separation sheet, a second electrode sheet, a second separation sheet, the first electrode sheet, and the SLMP layer are sequentially laminated.

The first electrode sheet may be a negative electrode sheet, and the second electrode sheet may be a positive electrode sheet.

The SLMP layer may be bonded to the negative electrode sheet laminated on each of the top and bottom surfaces of the finished radical unit sheet.

The lamination apparatus may further comprise a radical unit sheet heating part that heats the semi-finished radical unit sheet on which the film sheet is laminated.

The lamination apparatus may further comprise a radical unit sheet cutting part that cuts the finished radical unit sheet to a predetermined size to manufacture a finished radical unit, wherein the finished radical unit may have a structure in which the SLMP layer, a first electrode plate, a first separator, a second electrode plate, a second separator, the first electrode plate, and the SLMP layer are laminated.

The SLMP layer may have a thickness less than a thickness of an electrode sheet.

A manufacturing method of a manufacturing apparatus for a secondary battery comprising the above-described constituents according to an embodiment of the present invention comprises a radical unit sheet transfer step (S10) of transferring a semi-finished radical unit sheet on which a first electrode sheet is laminated on an outermost portion thereof, a film sheet transfer step (S20) of transferring the film sheet coated with a stabilized lithium metal powder (SLMP) layer to be closely attached to each of top and bottom surfaces of the semi-finished radical unit sheet, a film sheet pressing step (S30) of pressing the film sheet to be closely attached to the top and bottom surfaces of the semi-finished radical unit sheet to be bonded to the semi-finished radical unit sheet, wherein the SLMP layer applied to the film sheet is bonded to each of the top and bottom surfaces of the semi-finished radical unit sheet, and a film sheet removing step (S40) of removing the film sheet from the SLMP layer bonded to the semi-finished radical unit sheet to manufacture a finished radical unit sheet.

The lamination method may further comprise a radical unit sheet heating step (S25) of heating the top and bottom surfaces of the semi-finished radical unit sheet to increase a temperature, between the film sheet transfer step (S20) and the film sheet pressing step (S30).

The lamination method may further comprise a radical unit manufacturing step (S50) of cutting the finished radical unit sheet to a predetermined size to manufacture a finished radical unit.

The finished radical unit may have a structure in which the SLMP layer, a first electrode plate, a first separator, a second electrode plate, a second separator, the first electrode plate, and the SLMP layer are sequentially laminated.

The first electrode plate may be a negative electrode, and the second electrode plate may be a positive electrode.

A secondary battery manufactured through the above-described lamination method according to an embodiment of the present invention comprise a radical unit on which a first electrode plate is laminated on an outermost portion thereof and a stabilized lithium metal powder (SLMP) layer bonded to a surface of the first electrode plate.

The radical unit may have a structure in which a first electrode plate, a first separator, a second electrode plate, a second separator, and the first electrode plate are sequentially laminated.

Advantageous Effects

First, the secondary battery according to the first embodiment of the present invention may have a feature in which the stabilized lithium metal powder layer is bonded to the surface of the first electrode sheet laminated on the outermost portion. Thus, the first electrode sheet may be improved in charging/discharging efficiency by the stabilized lithium metal powder layer, resulting in an increase of energy density.

Particularly, the first electrode sheet may be provided as the negative electrode sheet, and the negative electrode sheet may be improved in charging/discharging efficiency by the stabilized lithium metal powder layer, and thus, the energy density may significantly increase to significantly improve the efficiency of the secondary battery.

Second, in the apparatus and method for manufacturing the secondary battery according to the second embodiment, the radical unit sheet in which the plurality of electrode sheets and the plurality of separation sheets are alternately laminated may be bonded, and simultaneously, the stabilized lithium metal powder layer may be bonded to the surface of the outermost first electrode sheet of the radical unit sheet. Therefore, the radical unit sheet to which the stabilized lithium metal powder layer is bonded may be continuously manufactured.

Particularly, the stabilized lithium metal powder layer and the radical unit sheet may be heated to increase a temperature before the stabilized lithium metal powder layer and the radical unit sheet are bonded to each other to significantly improve the adhesive force between the stabilized lithium metal powder layer and the radical unit sheet.

In addition, the radical unit sheet to which the stabilized lithium metal powder layer is bonded may be cut to a predetermined size to manufacture the radical unit to which the stabilized lithium metal powder layer is bonded. Therefore, the electrode assembly having the high charging/discharge efficiency and the high energy density may be manufactured with the radical unit manufactured as described above.

Further, the stabilized lithium metal powder layer may have a thickness less than a thickness of the first electrode sheet. The secondary battery may increase the energy density and also be prevented from excessive increase in thickness.

MODE FOR CARRYING OUT THE INVENTION

Figure 1:
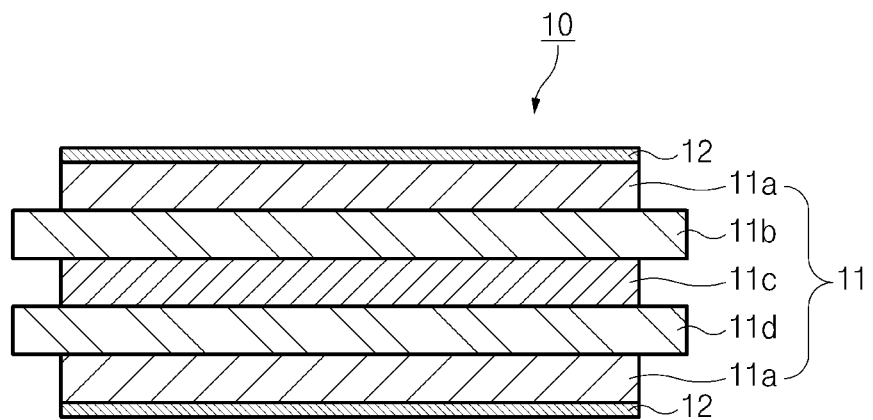
FIG. 1 is a cross-sectional view of a secondary battery according to a first embodiment of the present invention.

Hereinafter, embodiments of the present invention will be described in detail with reference to the accompanying drawings in such a manner that the technical idea of the present invention may easily be carried out by a person with ordinary skill in the art to which the invention pertains. The present invention may, however, be embodied in different forms and should not be construed as limited to the embodiments set forth herein. In the drawings, anything unnecessary for describing the present invention will be omitted for clarity, and also like reference numerals in the drawings denote like elements.

[Secondary Battery According to First Embodiment of the Present Invention]

A secondary battery according to a first embodiment of the present invention comprises an electrode assembly to which a stabilized lithium metal powder (SLMP) layer is bonded to the outermost portion thereof. The electrode assembly may be improved in charging/discharging efficiency due to the SLMP layer, resulting in an increase of energy density.

For example, as illustrated in FIG. 1, the secondary battery 1 according to the first embodiment of the present invention comprises an electrode assembly 10 and a case (not shown) that accommodates the electrode assembly 10. The electrode assembly 10 comprises a radical unit 11 on which a first electrode plate is laminated on the outermost portion thereof and a stabilized lithium metal powder layer 12 bonded to a surface of the first electrode plate.

Here, the radical unit 11 has a structure in which a first electrode plate 11a, a first separator 11b, a second electrode plate 11c, a second separator 11d, and the first electrode plate 11a are sequentially laminated. The first electrode plate 11a is a negative electrode, and the second electrode plate 11c is a positive electrode.

Thus, in the secondary battery 1 according to the first embodiment of the present invention, the electrode assembly 10 is manufactured by bonding a stabilized lithium metal powder (SLMP) layer 12 to a surface of the first electrode plate 11a laminated on the outermost portion of the radical unit 11. Particularly, the first electrode plate 11a that is a negative electrode may be improved in the charging/discharging efficiency by the SLMP layer 12, and thus, the electrode assembly 10 may be improved in the energy density, resulting in an increase of the life cycle.

The SLMP layer 12 may have a thickness less than a thickness of the electrode plate, i.e., each of the first electrode plate 11a and the second electrode plate 11c. When the SLMP layer 12 has a thickness greater than the thickness of the electrode plate, the charging/discharging efficiency may be stably improved, but manufacturing costs may significantly increase. In addition, the electrode assembly 10 may significantly increase in thickness to cause defective products.

Thus, the SLMP layer 12 has a thickness less than the thickness of the electrode plate to improve the charging/ discharging efficiency and thereby also to reduce the manufacturing costs and prevent an occurrence of a defective electrode assembly 10.

The SLMP layer 12 may have a surface area equal to or slightly less (1 mm to 5 mm less than a surface area of the first electrode plate) than the first electrode plate. In particular, the SLMP layer 12 may be bonded to be disposed inside the surface of the first electrode plate 11a to prevent an edge surface of the SLMP layer from being damaged by an external impact.

As described above, the secondary battery 1 according to the first embodiment of the present invention may comprise the electrode assembly 10 to which the SLMP layer 12 is bonded on the outermost portion thereof to improve the charging/discharging efficiency and the energy density.

The electrode assembly 10 to which the SLMP layer 12 is bonded on the outermost portion thereof may be manufactured by an apparatus 100 for manufacturing a secondary battery according to a second embodiment of the present invention.

[Secondary Battery According to Second Embodiment of the Present Invention]

Figure 2:
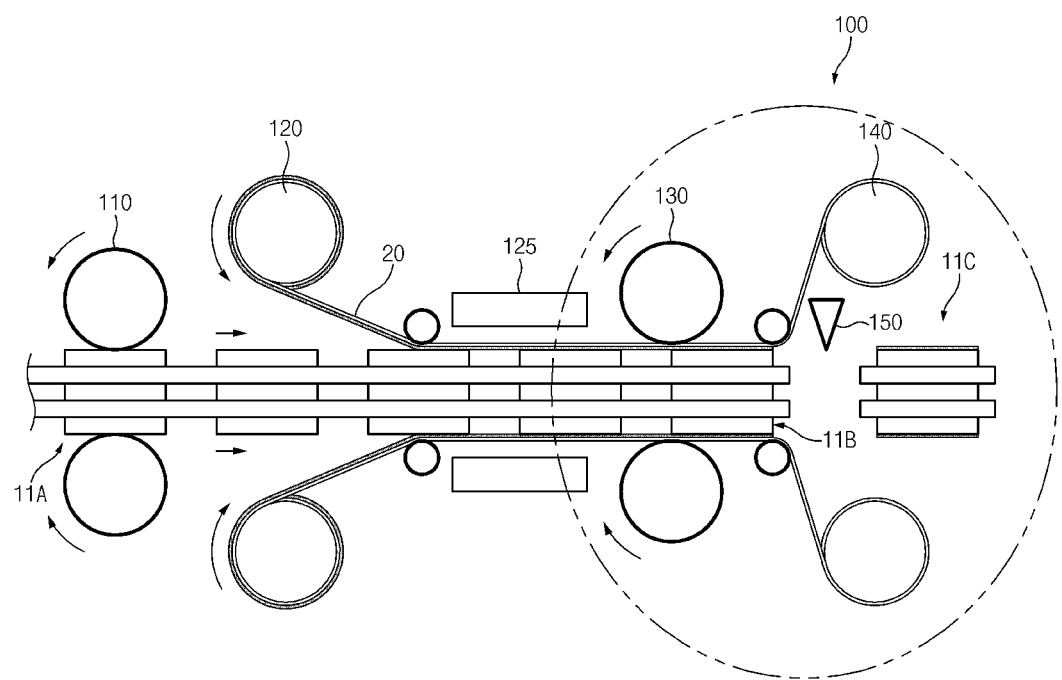
FIG. 2 is a view of an apparatus for manufacturing a secondary battery according to a second embodiment of the present invention.
Figure 3:
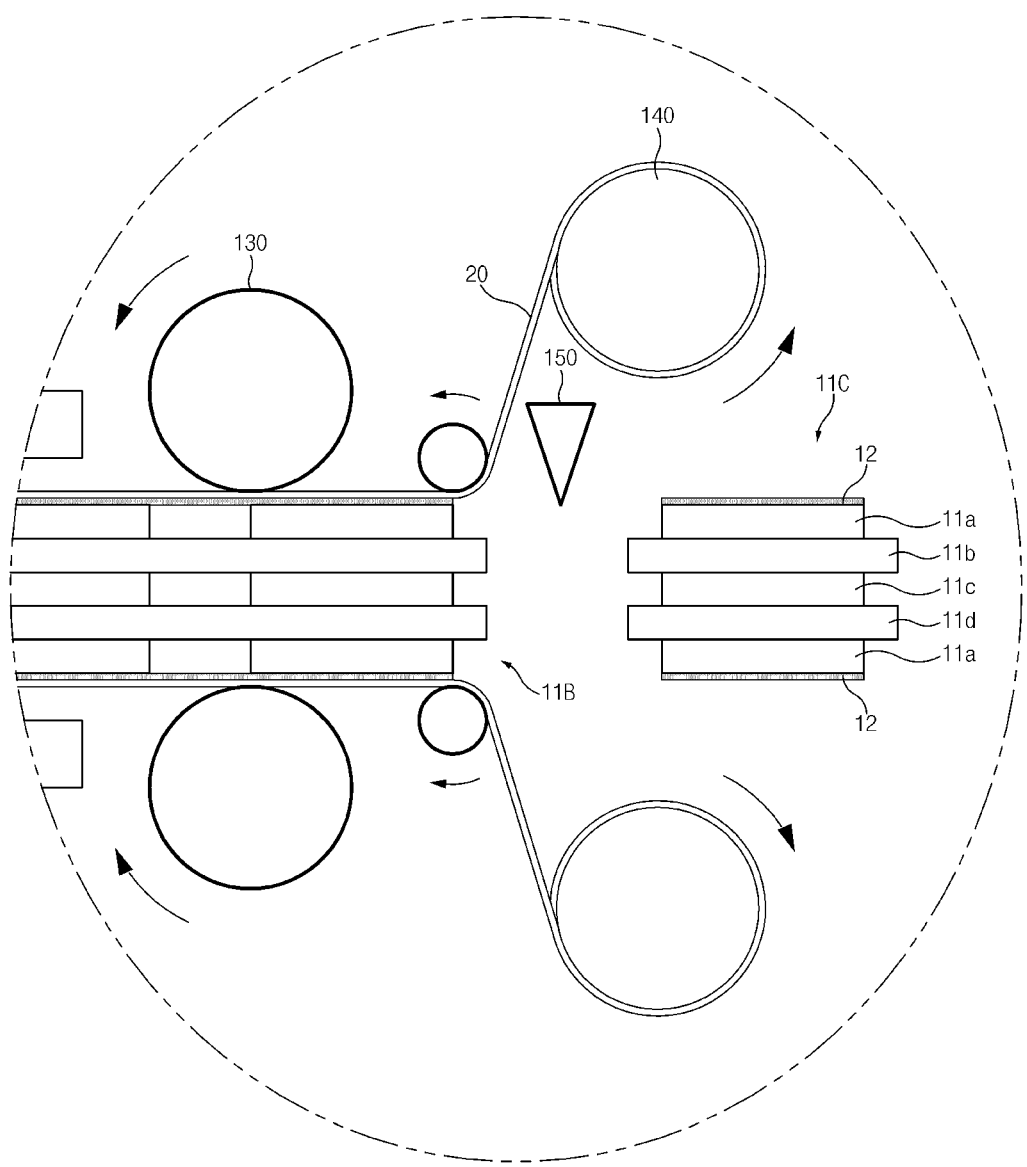
FIG. 3 is an enlarged view of a portion illustrated in FIG. 2.
Figure 4:
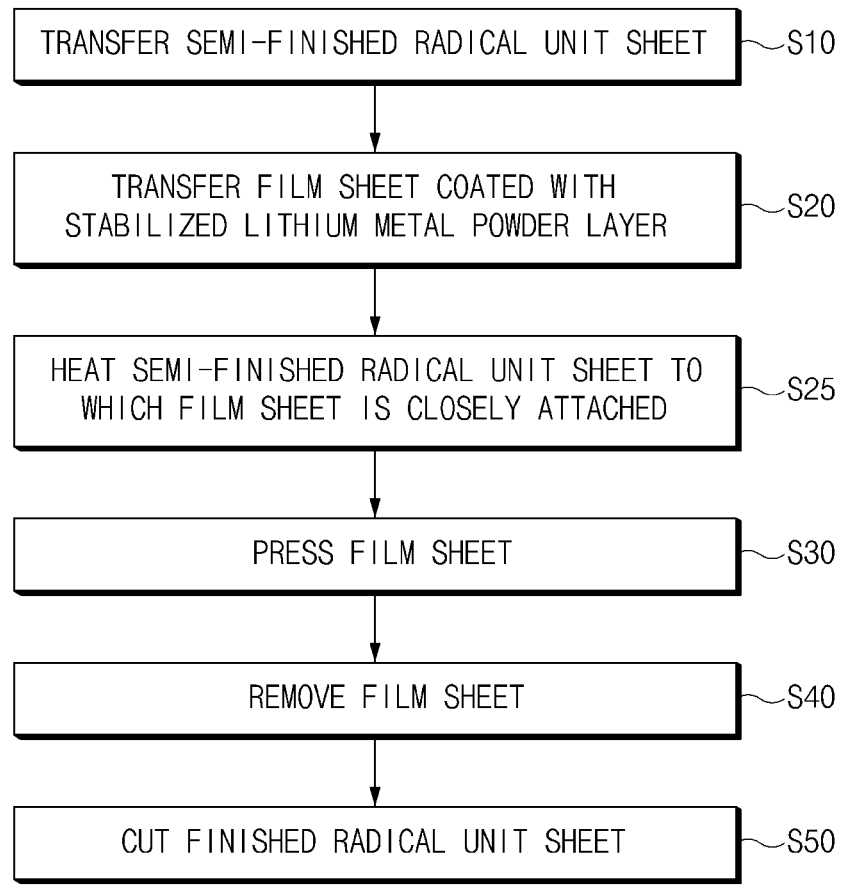
FIG. 4 is a flowchart that illustrates a method for manufacturing the second battery according to the second embodiment of the present invention.

As illustrated in FIGS. 2 and 3, the apparatus for manufacturing the secondary battery according to the second embodiment of the present invention comprises a radical unit sheet supply part 110 that supplies a semi-finished radical unit sheet 11A on which a first electrode sheet is laminated on the outermost portion thereof, a film sheet supply part 120 that supplies a film sheet 20 coated with a stabilized lithium metal powder (SLMP) layer 12 to be closely attached to each of top and bottom surfaces of the semi-finished radical unit sheet 11A, a film sheet pressing part 130 that presses and bonds the top and bottom surfaces of the semi-finished radical unit sheet 11A to which the film sheet 20 is closely attached, and a film sheet removing part 140 that removes the film sheet 20 from the SLMP layer 12 bonded to the semi-finished radical unit sheet 11A to manufacture a finished radical unit sheet 11B.

The radical unit sheet supply part 110 is provided as a pair of supply rollers. The pair of supply rollers presses the top and bottom surfaces of the semi-finished radical unit sheet 11A simultaneously to supply the semi-finished radical unit sheet 11A to the film sheet pressing part 130 by a rotation force thereof.

The semi-finished radical unit sheet 11A has a structure in which the first electrode sheet is laminated on the outermost portion thereof.

For example, the semi-finished radical unit sheet 11A has a structure in which the first electrode sheet, a first separation sheet, a second electrode sheet, a second separation sheet, and the first electrode sheet are vertically laminated.

Here, the first electrode sheet is a negative electrode sheet, and the second electrode sheet is a positive electrode sheet.

The film sheet supply part 120 is provided as a film sheet winding roller around which a film sheet 20 coated with the SLMP layer 12 is wound. The film sheet winding roller supplies the wound film sheet 20 to be closely attached to each of the top and bottom surfaces of the semi-finished radical unit sheet 11A. Here, the film sheet 20 is supplied so that the SLMP layer 12 faces the semi-finished radical unit sheet 11A.

Here, the SLMP layer 12 is closely attached to the surface of the first electrode sheet that is the negative electrode sheet.

The film sheet pressing part 130 is provided as a pair of pressing rollers. The pair of pressing rollers presses the top and bottom surfaces of the semi-finished radical unit sheet 11A, to which the film sheet 20 is closely attached, simultaneously to bond the plurality of electrodes comprising the semi-finished radical unit sheet 11A to the plurality of separators.

Also, the film sheet pressing part 130 bonds the SLMP layer 12 applied to the film sheet 20 to each of the top and bottom surfaces of the semi-finished radical unit sheet 11A.

In other words, the film sheet pressing part 130 bonds the semi-finished radical unit sheet 11A and simultaneously bonds the SLMP layer 12 applied to the film sheet 20 to the semi-finished radical unit sheet 11A.

A radical unit sheet heating part 125 may be further provided between the film sheet supply part 120 and the film sheet pressing part 130 to improve the adhesive force between the semi-finished radical unit sheet 11A and the SLMP layer 12.

The radical unit sheet heating part 125 comprises a pair of heating parts. The pair of heating parts may be disposed on upper and lower portions of the semi-finished radical unit sheet 11A to which the film sheet 20 is closely attached, respectively. When power is applied, high-temperature heat may be generated to heat the semi-finished radical unit sheet 11A, to which the film sheet 20 is closely attached, and increase the temperature of the semi-finished radical unit sheet 11A. Thus, the bonding between the electrode, the separator, and the SLMP layer 12 may be activated, and subsequently, in this state, when the semi-finished radical unit sheet 11A to which the film sheet 20 is closely attached is pressed, the adhesive force between the semi-finished radical unit sheet 11A and the SLMP layer 12 may increase.

In other words, since the semi-finished radical unit sheet 11A is pressed by the film sheet pressing part 130 while the semi-finished radical unit sheet 11A to which the film sheet 20 is closely attached is heated by the radical unit sheet heating part 125, the adhesive force of the semi-finished radical unit sheet 11A and the bonding force of the SLMP layer 12 may increase.

The film sheet removing part 140 may wind and collect the film sheet 20 from the SLMP layer 12 bonded to the semi-finished radical unit sheet 11A. Thus, the film sheet 20 may be removed from the SLMP layer 12 bonded to the semi-finished radical unit sheet 11A to manufacture the finished radical unit sheet 11B.

When the film sheet is removed by the film sheet removing part 140, the finished radical unit sheet 11B having a structure in which the SLMP layer, the first electrode sheet, the first separation sheet, the second electrode sheet, the second separation sheet, the first electrode sheet, and the SLMP layer are sequentially laminated.

Here, the SLMP layer 12 may be boned to an outer surface of the first electrode sheet that is the negative electrode sheet to improve the charging/discharging efficiency of the first electrode sheet, thereby increasing the energy density of the secondary battery.

A radical unit sheet cutting part 150 that cuts the finished radical unit sheet 11B manufactured as described above to a predetermined size to manufacture a finished radical unit 11C may be further provided.

The radical unit cutting part 150 is provided as a cutting blade that is vertically reciprocated. The cutting blade cuts the finished radical unit sheet 11B supplied at a uniform interval to the predetermined size.

Here, the finished radical unit 11C has a structure in which the SLMP layer 12, the first electrode plate 11a, the first separator 11b, the second electrode plate 11c, the second separator 11d, the first electrode plate 11a, and the SLMP layer 12 are laminated.

The apparatus for manufacturing the secondary battery, which comprise the above-described constituents, may continuously manufacture the radical unit in which the SLMP layer 12 is laminated and thus manufacture the secondary battery having the above-described structure Hereinafter, a method for manufacturing the secondary battery having the above-described constituents will be described.

[Method for Manufacturing Secondary Battery According to Second Embodiment of the Present Invention]

A method for manufacturing a secondary battery according to the second embodiment of the present invention may comprise a radical unit sheet transfer step (S10), a film sheet transfer step (S20), a film sheet pressing step (S30), and a film sheet removing step (S40).

Here, a radical unit sheet heating step (S25) may be further performed between the film sheet transfer step (S20) and the film sheet pressing step (S30). Further, a radical unit manufacturing step (S50) may be further performed after the film sheet removing step (S40).

In the radical unit sheet transfer step (S10), a semi-finished radical unit sheet 11A on which a first electrode sheet is disposed on the outermost portion thereof is transferred through a radical unit sheet supply part 110.

In the film sheet transfer step (S20), a film sheet 20 coated with a stabilized lithium metal powder (SLMP) layer is transferred through a film sheet supply part 120 so that the film sheet 20 is closely attached to each of top and bottom surfaces of the semi-finished radical unit sheet transferred by the radical unit sheet supply part 110.

In the radical unit sheet heating step (S25), the top and bottom surfaces of the semi-finished radical unit sheet 11A to which the film sheet 20 is closely attached may be heated through the radical unit sheet heating part 125 to be increased in temperature.

In the film sheet pressing step (S30), the top and bottom surfaces of the semi-finished radical unit sheet to which the film sheet 20 heated by the radical unit sheet heating step (S25) is closely attached may be pressed through the film sheet pressing part 130. In addition, the SLMP layer 12 applied to the film sheet 20 is bonded to each of the top and bottom surfaces of the semi-finished radical unit sheet.

In the film sheet removing step (S40), the film sheet 20 is wound and collected from the SLMP layer 12 bonded to the semi-finished radical unit sheet 11A to the film sheet removing part 140, thereby removing the film sheet 20 from the SLMP layer 12 bonded to the semi-finished radical unit sheet 11A. As a result, a finished radical unit sheet 11B may be manufactured.

In the radical unit manufacturing step (S50), the finished radical unit sheet 11B is cut to a predetermined size by the radical unit cutting part 150 to manufacture a finished radical unit 11C.

The finished radical unit 11C manufactured as described above has a structure in which the SLMP layer 12, the first electrode plate 11$a$, the first separator 11$b$, the second electrode plate 11$c$, the second separator 11$d$, the first electrode plate 11$a$, and the SLMP layer 12 are sequentially laminated.

Accordingly, the scope of the present invention is defined by the appended claims rather than the foregoing description and the exemplary embodiments described therein. Various modifications made within the meaning of an equivalent of the claims of the invention and within the claims are to be regarded to be in the scope of the present invention.

The invention claimed is:

1. An apparatus for manufacturing a secondary battery, the apparatus comprising:
   a radical unit sheet supply part that supplies a semi-finished radical unit sheet on which a first electrode sheet is laminated on an outermost portion thereof;
   a film sheet supply part that supplies a film sheet coated with a stabilized lithium metal powder (SLMP) layer to attach the film sheet to each of top and bottom surfaces of the semi-finished radical unit sheet, the film sheet supply part being provided as a film sheet winding roller around which the film sheet coated with the SLMP layer is wound around;
   a film sheet pressing part that presses the film sheet to be closely attached to each of the top and bottom surfaces of the semi-finished radical unit sheet to be bonded to the semi-finished radical unit sheet, the film sheet pressing part allowing the SLMP layer applied to the film sheet to be bonded to each of the top and bottom surfaces of the semi-finished radical unit sheet; and
   a film sheet removing part that removes the film sheet from the SLMP layer bonded to the semi-finished radical unit sheet to manufacture a finished radical unit sheet, the film sheet removing part being provided as a film sheet removing roller that winds and collects the film sheet from the SLMP layer bonded to the semi-finished radical unit sheet.

2. The apparatus of claim 1, wherein the finished radical unit sheet has a structure in which the SLMP layer, the first electrode sheet, a first separation sheet, a second electrode sheet, a second separation sheet, the first electrode sheet, and the SLMP layer are sequentially laminated.

3. The apparatus of claim 2, wherein the first electrode sheet is a negative electrode sheet, and the second electrode sheet is a positive electrode sheet, and
   the SLMP layer is bonded to the negative electrode sheet laminated on each of the top and bottom surfaces of the finished radical unit sheet.

4. The apparatus of claim 1, further comprising a radical unit sheet heating part that heats the semi-finished radical unit sheet on which the film sheet is laminated.

5. The apparatus of claim 1, further comprising a radical unit sheet cutting part that cuts the finished radical unit sheet to a predetermined size to manufacture a finished radical unit,
   wherein the finished radical unit has a structure in which the SLMP layer, a first electrode plate, a first separator, a second electrode plate, a second separator, the first electrode plate, and the SLMP layer are laminated.

6. The apparatus of claim 1, wherein the SLMP layer has a thickness less than a thickness of an electrode sheet.

7. A method for manufacturing a secondary battery, the method comprising:
   a radical unit sheet transfer operation of transferring a semi-finished radical unit sheet on which a first electrode sheet is laminated on an outermost portion thereof;
   a film sheet transfer operation of transferring the film sheet coated with a stabilized lithium metal powder (SLMP) layer to attach on each of top and bottom surfaces of the semi-finished radical unit sheet using a film sheet supply part provided as a film sheet winding roller around which the film sheet coated with the SLMP layer is wound around;
   a film sheet pressing operation of pressing the film sheet to be closely attached to the top and bottom surfaces of the semi-finished radical unit sheet to be bonded to the semi-finished radical unit sheet, wherein the SLMP layer applied to the film sheet is bonded to each of the top and bottom surfaces of the semi-finished radical unit sheet; and a film sheet removing operation of removing the film sheet from the SLMP layer bonded to the semi-finished radical unit sheet to manufacture a finished radical unit sheet by using a film sheet removing part provided as a film sheet removing roller that winds and collects the film sheet from the SLMP layer bonded to the semi-finished radical unit sheet.

8. The method of claim 7, further comprising a radical unit sheet heating operation of heating the top and bottom surfaces of the semi-finished radical unit sheet to increase a temperature, between the film sheet transfer operation and the film sheet pressing operation.

9. The method of claim 7, further comprising a radical unit manufacturing operation of cutting the finished radical unit sheet to a predetermined size to manufacture a finished radical unit.

10. The method of claim 9, wherein the finished radical unit has a structure in which the SLMP layer, a first electrode plate, a first separator, a second electrode plate, a second separator, the first electrode plate, and the SLMP layer are sequentially laminated.

11. The method of claim 10, wherein the first electrode plate is a negative electrode, and the second electrode plate is a positive electrode.

12. A secondary battery comprising:

a finished radical unit of claim 5, wherein the first electrode plate is laminated on an outermost portion of the finished radical unit, and the SLMP layer is bonded to a surface of the first electrode plate.

13. The secondary battery of claim 12, wherein the first electrode plate is provided as a negative electrode plate.

14. The method of claim 7, wherein the SLMP layer is formed continuously on the film sheet.

15. The secondary battery of claim 1, wherein the SLMP layer is formed continuously on the film sheet.

* * * * *